Sept. 1, 1931.  F. K. KRAG ET AL  1,821,520
PIPE THREAD PROTECTOR
Filed March 29, 1930
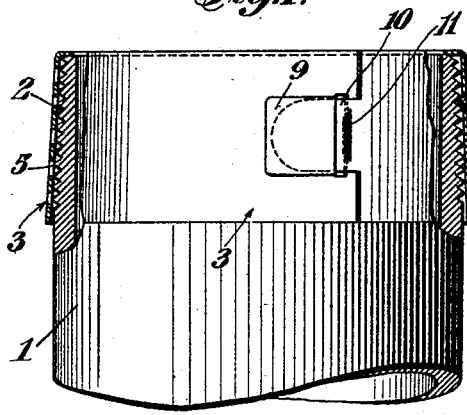
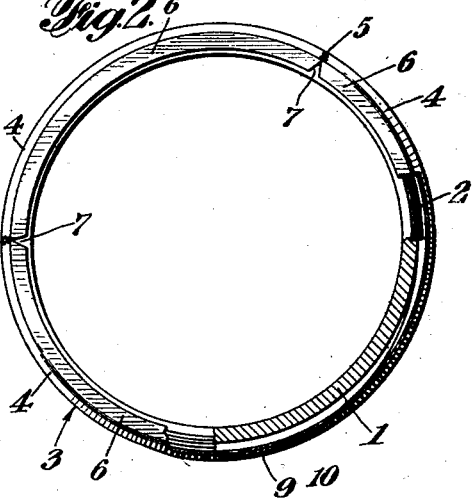
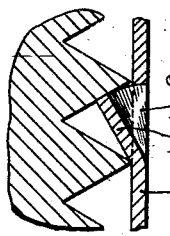
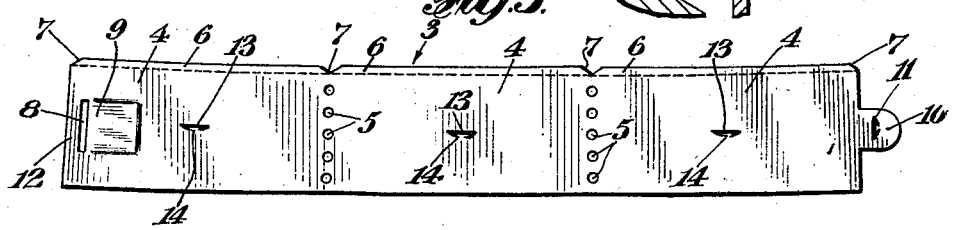
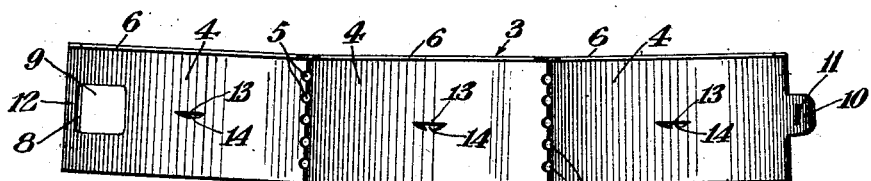
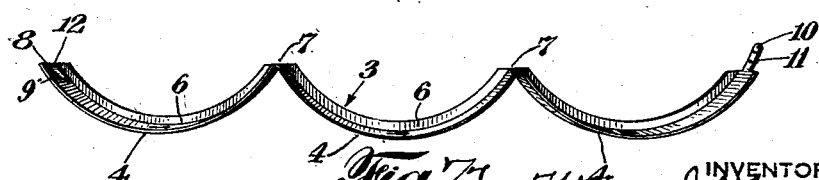
INVENTOR
Franz K. Krag & John Victor Nelson
BY
Prindle, Bean & Mann
ATTORNEYS Patented Sept. 1, 1931

1,821,520

UNITED STATES PATENT OFFICE

FRANZ K. KRAG, OF CHICAGO, AND JOHN VICTOR NELSON, OF ELMHURST, ILLINOIS, ASSIGNORS TO U. S. MANUFACTURING CORPORATION, OF DECATUR, ILLINOIS, A CORPORATION OF ILLINOIS

PIPE THREAD PROTECTOR

Application filed March 29, 1930. Serial No. 439,903.

This invention relates to improvements in a pipe thread protector that is a device for protecting the threads of pipe during shipment to prevent mutilation, distortion, and destruction of these threads.

Among the objects of this invention are the provisions of such a device which are manufactured in a more or less flat condition and may be shipped nested so as to take up a minimum amount of space; the sections are formed in the true arc of a circle so that when applied to the pipe they may be bent into a true circle to accurately fit the pipe; the walls of the device are slightly inclined to follow the taper of the thread on the end of the pipe so that the protector may act as a nut and be screwed on the threaded end of the pipe; the device is perforated in a number of places so that it may be readily bent to fit the ends of the pipe to which it is applied, and it is made of cheap material and at a minimum expense.

To the accomplishment of the foregoing and such other objects as may hereinafter appear, this invention consists in the construction, combination and arrangemet of parts hereinafter described and then sought to be defined in the appended claims, reference being had to the accompanying drawings forming a part hereof and which show, merely for the purpose of illustrative disclosure, a preferred embodiment of my invention, it being expressly understood, however, that various changes may be made in practice within the scope of the claims without digressing from my inventive idea.

In the drawings—

Figure 1 is a partial sectional view showing the device applied to the threaded end of a pipe.

Figure 2 is a top plan view showing the device applied to the threaded end of a pipe with parts broken away to facilitate the disclosure.

Figure 3 is an enlarged view of the ends of the device showing the locking means for connecting the ends together.

Figure 4 is an enlarged detail view showing a detent on the wall of the device which is adapted to engage the threads of a pipe.

Figure 5 is a front elevation of the device before it is applied to a pipe.

Figure 6 is a rear elevation of the device before it is applied to a pipe.

Figure 7 is a bottom plan view showing the inclination of the walls from the vertical.

Referring now to the drawings the numeral 1 designates a pipe having the threaded end 2. The device of this invention is adapted to protect this threaded end and it is designated generally by the reference character 3. It is formed of a plurality of arcuate sections 4 which are bent on the true arc of a circle so that when the device is bent as a whole it will form a true circle to fit the end of the pipe. In order to facilitate this bending the material is perforated or slotted as at 5 so that the sections may be readily bent with relation to each other.

A laterally extending flange 6 is provided along the top edge of the device to protect the end of the pipe and this flange is cut out at intervals as at 7 to correspond to the line of perforations previously referred to so as to permit the bending of the sections with relation to each other.

One end of the device is provided with the slot 8 communicating with a recessed portion 9 formed by depressing the material and adapted to receive the end of the tongue 10 extending from the other end of the device. This tongue has an intermediate portion struck out to form a detent 11 which is adapted to engage and latch with the edge of the bar 12 formed by the slot 8 on the other end of the device. In assembling these parts in circular relation about the pipe end, the tongue will spring into engagement due to the resilient material of which the device is made.

In order to prevent the accidental removal of the device from the pipe end we provide a plurality of detents on the inside of the sections by striking in the material thereof as at 13, providing a sharp edged detent 14 which engages the threads on the end of the pipe and securely holds the protector thereon. This engagement is such that the protector may be rotated or screwed thereon, as a nut.

The device is made in substantially flat form, each section, however, being in the form of a true arc of a circle so that the devices may be nested and shipped in a minimum amount of packing space. The perforations provide lines of weakness along which the sections may be bent to form a true circle about the end of a pipe and when the locking tongue is inserted in position the detent thereon automatically latches in place.

The side wall of the protector extends at substantially the same angle as the threads on the pipe end which causes it to fit firmly thereon without any opportunity for play or relative movement so that the device is always held securely in position on the pipe end.

What we claim is:

1. A pipe thread protector composed of a plurality of arcuate sections each formed as a true arc of a circle with the material of the device weakened along lines between the sections so that while they may be shipped in substantially extended non-circular condition, they may be readily bent along such lines to form a true circle, each section being provided with an end, laterally extending flange adapted to cover and protect the end of the pipe and the end sections having complementary locking means adapted to be connected together when applied to a pipe.

2. A pipe thread protector composed of a plurality of arcuate sections each formed as a true arc of a circle with the material of the device weakened along lines between the sections so that while they may be shipped in substantially extended non-circular condition, they may be readily bent along such lines to form a true circle, each section being provided with an end, laterally extending flange adapted to cover and protect the end of the pipe and the end sections having complemetary locking means adapted to be connected together when applied to a pipe, said locking means comprising a tongue having a detent formed therein on one section and a slot and recess and locking abutment provided on the other end section so as to receive said tongue.

3. A pipe thread protector composed of a plurality of arcuate sections each formed as a true arc of a circle with the material of the device weakened along lines between the sections so that while they may be shipped in substantially extended non-circular condition, they may be readily bent along such lines to form a true circle, each section being provided with an end, laterally extending flange adapted to cover and protect the end of the pipe and the end sections having complementary locking means adapted to be connected together when applied to a pipe, and a plurality of projections provided on the inside of said sections to engage the threads of the pipe.

4. As an article of manufacture, a pipe thread protector composed of resilient material formed in sections of arcuate shape with weakened portions forming the junctions between said sections, each section being provided with an end, laterally extending flange adapted to protect the end of the pipe, the flanges of each section being separated so as to permit the bending of the sections relative to each other into a true circle, and means for connecting the ends of the two end sections together when assembled on a pipe end.

5. As an article of manufacture, a pipe thread protector comprising a plurality of arcuate sections of resilient material having an extended side wall slightly inclined to the vertical and having weakened portions at the junctions of the sections to permit ready bending of the sections with relation to each other, each section having an end, laterally extending flange and the end sections having complementary locking means for locking the ends of the device together about the pipe end.

6. As an article of manufacture, a pipe thread protector comprising a plurality of arcuate sections of resilient material having an extended side wall slightly inclined to the vertical and having weakened portions at the junctions of the sections to permit ready bending of the sections with relation to each other, each section having an end, laterally extending flange and the end sections having complementary locking means for locking the ends of the device together about a pipe end, and means provided in each section for engaging the threads of a pipe end.

7. A pipe thread protector comprising a plurality of arcuate sections with the material of the device weakened along lines between the sections so that while a plurality of protectors may be shipped in a substantially extended, nested condition, each of the sections may be readily bent along said weakened lines to form the device, each section being provided at one end with a laterally extending flange adapted to protect the end of the pipe, the flanges of each section being separated so as to permit the bending of the sections relatively to each other, and the end sections having complementary locking means adapted to be connected together when applied to a pipe, said locking means including a tongue having a detent formed therein on one section.

8. As an article of manufacture, a pipe thread protector composed of resilient material formed in sections of arcuate shape with weakened portions forming the junctions between said sections, each protector being so formed that a plurality of protectors is adapted to be shipped in a substantially extended, nested condition, each section being provided at one end with a laterally extending flange adapted to protect the end of the pipe, and the end sections having complementary locking means adapted to be connected together when the device is applied to the threaded end of a pipe, said locking means comprising a tongue having a detent formed therein on one end section, and a slot and recess and locking abutment provided on the other end section adapted to receive said tongue.

In testimony that we claim the foregoing, we have hereunto set our hands this 17th day of March, 1930.

FRANZ K. KRAG.
JOHN VICTOR NELSON.